(12) United States Patent
Krause

(10) Patent No.: US 9,504,983 B2
(45) Date of Patent: Nov. 29, 2016

(54) SYSTEM AND METHOD FOR CONVERTING BIOMASS INTO FUEL, OIL AND OTHER USEFUL PRODUCTS

(71) Applicant: Karlton D. Krause, Iowa Falls, IA (US)

(72) Inventor: Karlton D. Krause, Iowa Falls, IA (US)

( * ) Notice: Subject to any disclaimer, the term of this patent is extended or adjusted under 35 U.S.C. 154(b) by 191 days.

(21) Appl. No.: 14/509,084

(22) Filed: Oct. 8, 2014

(65) Prior Publication Data

US 2015/0099909 A1  Apr. 9, 2015

Related U.S. Application Data

(60) Provisional application No. 61/888,657, filed on Oct. 9, 2013.

(51) Int. Cl.

| | |
|---|---|
| *B01J 19/00* | (2006.01) |
| *B01J 19/18* | (2006.01) |
| *B01J 19/20* | (2006.01) |
| *C10G 1/02* | (2006.01) |
| *C10L 1/02* | (2006.01) |
| *C10L 1/04* | (2006.01) |
| C10G 1/00 | (2006.01) |
| C10L 1/00 | (2006.01) |
| A01C 3/00 | (2006.01) |

(52) U.S. Cl.
CPC ............... *B01J 19/20* (2013.01); *C10G 1/02* (2013.01); *C10L 1/02* (2013.01); *C10L 1/04* (2013.01); *C10G 2300/1011* (2013.01); *Y02P 30/20* (2015.11)

(58) Field of Classification Search
CPC .......... B01J 19/00; B01J 19/18; B01J 19/20; C10G 1/00; C10G 1/02; C10G 2300/00; C10G 2300/10; C10G 2300/1011; C10L 1/00; C10L 1/02; C10L 1/04; Y02P 30/00; Y02P 30/20; Y02E 50/00; Y02E 50/30; C10J 2300/00; C10J 2300/0913; C10J 2300/0916; A01C 3/00

See application file for complete search history.

(56) References Cited

U.S. PATENT DOCUMENTS

| | | | |
|---|---|---|---|
| 7,105,088 B2 | 9/2006 | Schien et al. | |
| 7,597,812 B2 | 10/2009 | Schien et al. | |
| 7,815,889 B2* | 10/2010 | Luan | C04B 11/0283 423/636 |
| 7,985,345 B2 | 7/2011 | Lux et al. | |
| 2009/0326189 A1* | 12/2009 | Tazzia | C08G 59/00 528/421 |
| 2013/0079565 A1 | 3/2013 | Miller | |
| 2014/0332366 A1* | 11/2014 | Robinson | C10G 1/00 203/14 |

* cited by examiner

*Primary Examiner* — Natasha Young
(74) *Attorney, Agent, or Firm* — Christopher A. Proskey; BrownWinick Law Firm

(57) ABSTRACT

A system for converting animal waste into fuel, oil and other useful products is presented and includes a confinement building, a waste storage facility or lagoon for holding animal waste, a solids separating system for separating solids from liquids, a mixing and macerating unit for mixing the proper combination of fluids and solids and for managing the particle size, a pumping unit for pressurizing the system, a first heat exchanger unit, a reactor vessel, a second heat exchanger unit, an oil and water separating unit and an oil storage facility. The reactor vessel includes at least one auger blade that extend around a centrally positioned column that conducts heat into the reactor vessel. The animal waste is pumped through the reactor vessel as heated is applied. The heat and pressure converts the animal waste to oil and water which is later separated.

20 Claims, 9 Drawing Sheets

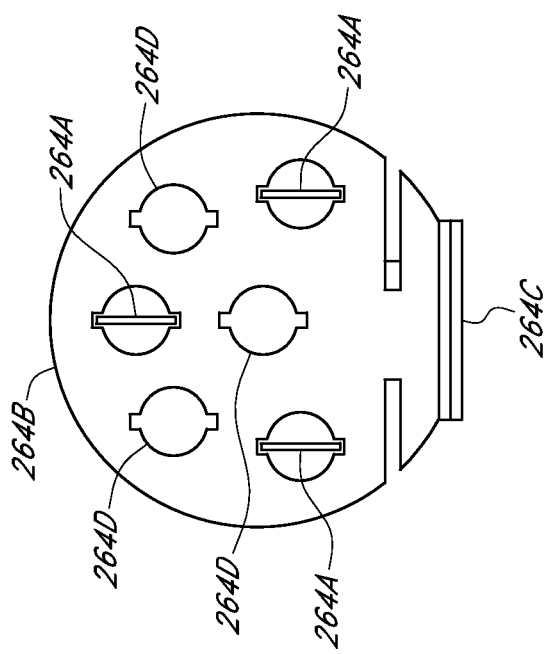

SYSTEM AND METHOD FOR CONVERTING BIOMASS INTO FUEL, OIL AND OTHER USEFUL PRODUCTS

CROSS REFERENCE TO RELATED APPLICATION

This application claims the benefit of U.S. Provisional Application No. 61/888,657 filed Oct. 9, 2013.

FIELD OF THE INVENTION

This invention relates to an apparatus, system and method for converting waste into useful products. More specifically, and without limitation, this invention relates to an apparatus, system and method of converting animal waste into fuel, oil and other valuable products.

BACKGROUND OF THE INVENTION

Animal waste, as the term is used herein, includes a combination of feces as well as urine which is produced by animals. Historically, animals, such as cows, chickens, turkeys, pigs and the like were raised for human consumption in open fields or pastures where the animals range freely. In this arrangement, the animal waste is spread over a large area and as such the animal waste it is not allowed to concentrate in any single area.

The efficiency of husbandry practices have evolved over time from raising animals in open spaces, to raising a great number of animals in what are known conventionally as confinement buildings. These confinement buildings house anywhere from several hundred to several thousand animals. While these systems improve the efficiency of raising animals and growing them to market weight, these large confinement buildings have generated a new set of problems.

Namely, by concentrating a great number of animals within a single building, the waste these animals produce has similarly been concentrated. It is well known that a single pig finishing-growing pig that weighs between 150 lbs. and 200 lbs. produces anywhere from 9 lbs. to 15 lbs. of waste per day, or between 1.6 tons and 2.7 tons of waste per year. That means a conventional confinement building that houses 1500 head, produces between 2,500 tons and 4,100 tons of animal waste per year.

Various systems, methods and practices have been developed to handle this high volume of concentrated animal waste. These systems include slotted floors that the animals stand on which allows the animal waste to fall through the floor to a runoff system such as a holding pond, lagoon or waste station positioned there below.

This waste is high in concentrations of various valuable nutrients such as Nitrogen, Phosphate, Potash, and Sulfur, among others. If handled properly, these nutrients can be recycled and used for beneficial purposes, such as fertilizing farm fields for growing crops. If, on the other hand, this animal waste is improperly handled, it can lead to substantial environmental damage or degradation, water pollution, or the like. As such, substantial effort and energy must be allocated to ensure the animal waste is handled properly.

Conventionally, much of this animal waste is trucked to nearby farm fields and spread over on or knifed into the soil to serve as fertilizer for the following year's crop. This spreading of the animal waste across large areas dilutes the deleterious effects of the animal waste.

Despite these advances in handling animal waste, problems still remain. Namely, it is costly to truck the animal waste to farm fields for its dispersal. In addition, while using the animal waste for fertilizer is a suitable way of disposing of the animal waste, it is often not cost effective. That is, even when a farmer spreads animal waste on a particular field, due to environmental regulations placed on the amount of manure that can be applied per acre, additional supplemental fertilizer may be required to achieve optimum plant nutrition and growth. This either causes potential yield loss or requires additional expense, time and energy for the purchase and application of additional fertilizer, not to mention the additional wear and tear on the farmer's equipment.

Another deficiency of the current system is that not much value or income is generated from the vast amount of animal waste produced from conventional confinement buildings. While using this animal waste as fertilizer is useful, the animal waste has tremendously valuable constituents therein, the value of which is not fully harnessed by merely using the animal waste as fertilizer.

Various systems have been developed in an attempt to harness the value of animal waste in an attempt to convert the animal waste into an energy source. However, all of these systems suffer from substantial deficiencies in design and/or function. One such system includes U.S. Pat. No. 7,105,088 to Schien et al. entitled Methods and Systems for Converting Waste Into Energy, issued Sep. 12, 2006; and its related U.S. Pat. No. 7,597,812 to Schien et al. entitled Methods and Systems for Converting Waste Into Energy, issued Oct. 6, 2009; and its related U.S. Pat. No. 7,985,345 to Lux et al. entitled Methods and Systems for Converting Waste Into Complex Hydrocarbons, issued Jul. 26, 2011. One substantial deficiency in these systems, with reference to FIG. 8, is that the animal waste is pumped through a coiled tubing (204) which is positioned within a heated chamber (200). This arrangement provides substantial challenges in the event that the system ever stops because the converted or partially converted animal waste will harden within the coiled tubing (204) causing substantial down time and substantial repair costs. Another deficiency of this system is that over time, plaque builds-up within the tubing (204) thereby reducing or constricting the flow of animal waste through the tubing (204) which causes the tubing (204) to be insulated from the heat of the chamber (200) as well as causing a restriction in the flow through the tubing. Another similar system is presented as U.S. Patent Publication No. 2013/0079565 to Miller entitled Hydrothermal Conversion of Biomass to Hydrocarbon Products; among others. This system, like the others, suffers from the deficiency of using similar tubing. While these systems have provided some efficacy, they are all lacking in various ways, such as efficiency, ease of use, durability, longevity, throughput, and the like.

Thus, it is a primary object of the invention to provide a system and method for converting animal waste into fuel and other useful products that improves upon the state of the art.

Another object of the invention is to provide a system and method for converting animal waste into fuel and other useful products that provides greater value to a producer than merely using the animal waste as fertilizer.

Yet another object of the invention is to provide a system and method for converting animal waste into fuel and other useful products that is durable.

Another object of the invention is to provide a system and method for converting animal waste into fuel and other useful products that is easy to clean.

Yet another object of the invention is to provide a system and method for converting animal waste into fuel and other useful products that provides a continuous flow.

Another object of the invention is to provide a system and method for converting animal waste into fuel and other useful products that is efficient.

Yet another object of the invention is to provide a system and method for converting animal waste into fuel and other useful products that recycles heat and energy.

Another object of the invention is to provide a system and method for converting animal waste into fuel and other useful products produces oil, fuel and other useful and valuable products.

Yet another object of the invention is to provide a system and method for converting animal waste into fuel and other useful products that can be utilized in large and small scale confinement building operations.

Another object of the invention is to provide a system and method for converting animal waste into fuel and other useful products that reduces the amount of waste a producer must handle and dispose of.

Yet another object of the invention is to provide a system and method for converting animal waste into fuel and other useful products that provides the animal producer with an alternative source of income.

Another object of the invention is to provide a system and method for converting animal waste into fuel and other useful products that is simple.

Yet another object of the invention is to provide a system and method for converting animal waste into fuel and other useful products that has a minimum number of parts.

Another object of the invention is to provide a system and method for converting animal waste into fuel and other useful products that is inexpensive.

Yet another object of the invention is to provide a system and method for converting animal waste into fuel and other useful products that has an intuitive design.

These and other objects, features, or advantages of the present invention will become apparent from the specification and claims.

SUMMARY OF THE INVENTION

A system for converting animal waste into fuel, oil and other useful products is presented and includes a confinement building, a waste storage facility or lagoon for holding animal waste, a solids separating system for separating solids from liquids, a mixing and macerating unit for mixing the proper combination of fluids and solids and for managing the particle size, a pumping unit for pressurizing the system, a first heat exchanger unit, a reactor vessel, a second heat exchanger unit, an oil and water separating unit and an oil storage facility. The reactor vessel includes at least one auger blade that extend around a centrally positioned column that conducts heat into the reactor vessel. The animal waste is pumped through the reactor vessel as heated is applied. The heat and pressure converts the animal waste to oil and water which is later separated.

BRIEF DESCRIPTION OF THE DRAWINGS

FIG. 8B is an end elevation view of a heating element for use in the system.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the invention(s). The following detailed description is, therefore, not to be taken in a limiting sense, and the scope of the invention(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the invention.

As used herein, the invention is shown and described as being used in association with animal waste from a hog confinement building system. However the invention is not so limiting. Instead, one of ordinary skill in the art will appreciate that the system and method presented herein can be used, and therefore is contemplated for use, with any and all biomasses, such as sewage sludge, animal manure, plant material along with waste from food processing facilities, dairy production, meat processing facilities and similar operations, industries and facilities (hereinafter "biomass"). The system and method is merely shown and described as being used in association with a hog confinement building system as one of countless examples.

Figure 1:
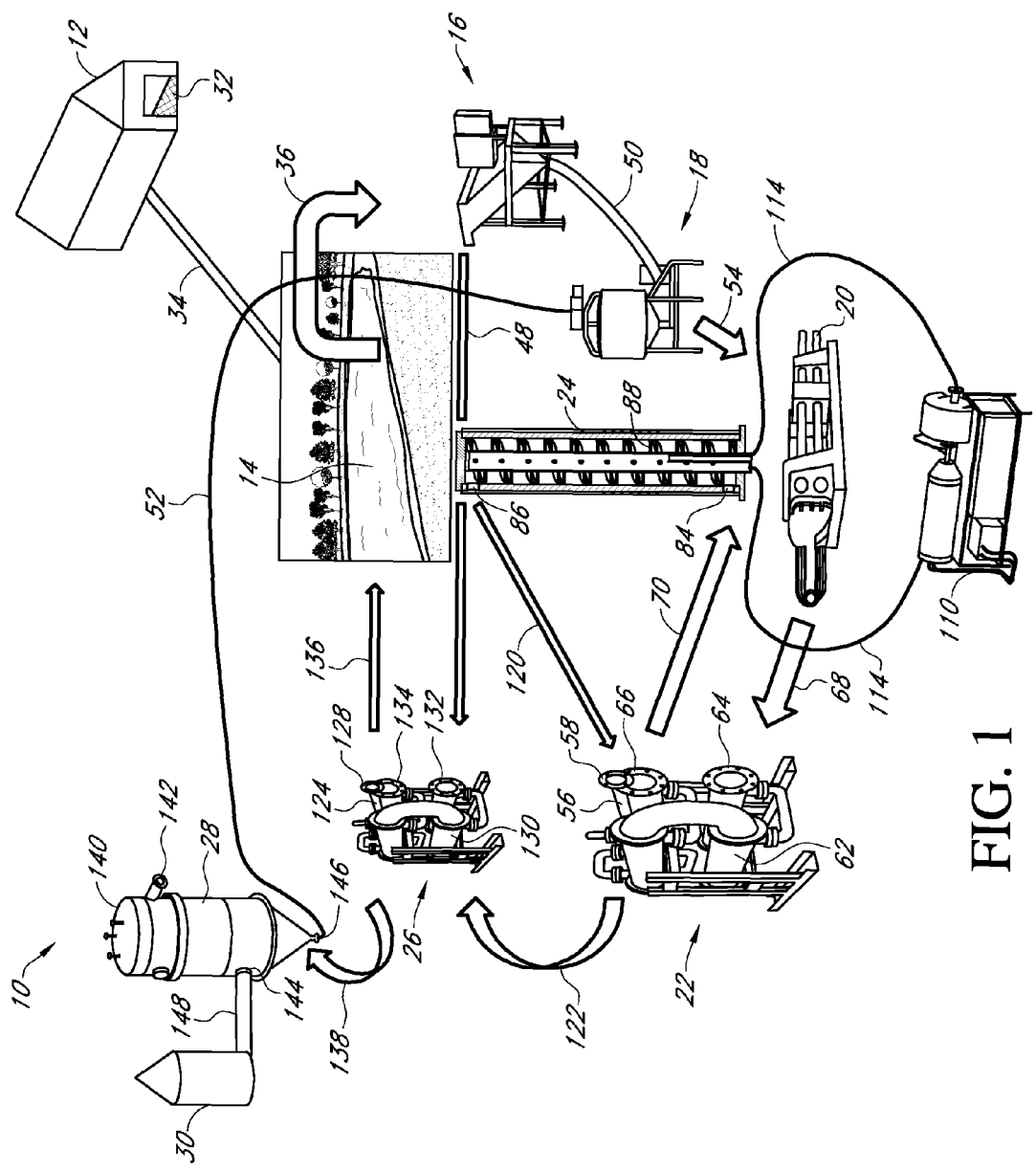
FIG. 1 is a plan view of the individual components of a first embodiment of the system and how the components are linked to one another.

With reference to FIG. 1, a first embodiment for converting biomass into fuel, oil and other useful products is presented with respect to reference numeral 10. System 10 includes a confinement building 12, waste storage facility or lagoon 14, a solids separating system 16, a mixing and macerating unit 18, a pumping unit 20, a first heat exchanger unit 22, a reactor vessel 24, a second heat exchanger unit 26, an oil and water separating unit 28 and an oil storage facility 30.

Confinement Building:

The system 10 includes a confinement building 12. Confinement building 12 is formed of any suitable size, shape and design. In one arrangement, for ease of understanding, a conventional hog confinement building 12 is presented which houses hundreds to thousands of hogs under a single roof. These hogs stand on a floor 32 with openings therein such that their urine and feces falls through the floor with the force of gravity. This animal waste (biomass) is captured in a runoff system 34 which is fluidly transfers the animal waste (biomass) to the waste storage facility or lagoon 14. Multiple hog confinement buildings 12 can be connected through a runoff system 34 to a single waste storage facility or lagoon 14 to increase the amount of animal waste (biomass).

Waste Storage Facility:

The system 10 includes a waste storage facility or lagoon 14. Lagoon 14 is formed of any suitable size, shape and design which holds the animal waste (biomass) from confinement building 12, both solids and fluids. In one arrangement, lagoon 14 is simply a pond. In another arrangement, lagoon 14 is a tank, pit or any other form of a fluid holding device is hereby contemplated for use. The animal waste (biomass) held within lagoon 14 is stored at ambient temperature. Lagoon 14 is fluidly connected to solids separating system 16 by means of pipe, line or tube 36.

Solids Separating System:

The system 10 includes a solids separating system 16. Solids separating system 16 is formed of any suitable size, shape and design. The animal waste (biomass) stored within lagoon 14 is formed of a combination of solids and liquids. The concentration of solids to liquids can vary substantially based on countless variables. This variability causes substantial variability in operation of the system 10 unless the solid-to-liquid ratio is controlled. As such, solids separating system 16 is employed to separate and control the ratio of solids-to-liquids in the output from lagoon 14. Any form of a separating system is hereby contemplated for use such as a filtering system, a centrifuge system, or the like.

In one arrangement, as an example, a parallel plate vertical clarifier system manufactured by Monroe Environmental Corporation of 810 West Front Street, Monroe, Mich. 48161 is hereby contemplated for use in the system 10. The Monroe Parallel Plate Vertical Clarifier is designed to provide low cost, efficient solids removal from a wide range of waste and process liquids. The inclined plate design allows the total gravity settling area to be as much as ten times more than the actual floor space occupied by the clarifier. Integral chemical mixing and flocculation tanks are available and can be used. This unit is typically used to remove solids from industrial waste and process waters. For municipal treatment plants, they are often used to clarify and remove solids from sand filter backwash water and other filtration processes.

Figure 2:
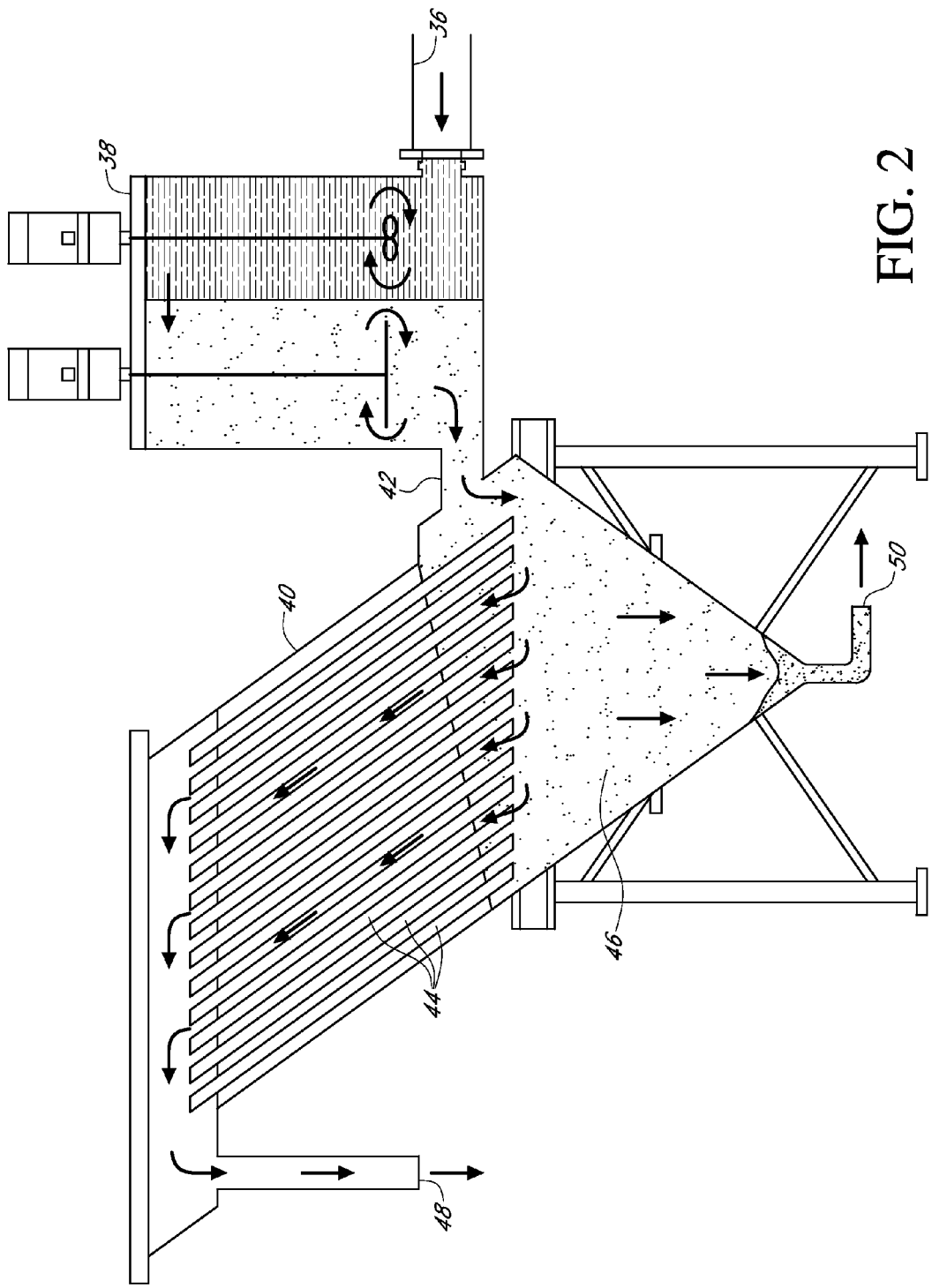
FIG. 2 is an elevation cut-away view of a solids separating system.

With reference to FIG. 2, a Monroe Vertical Clarifier system is presented for use as solids separating system 16. The pipe 36 from lagoon 14 is connected to an optional flash mix and flocculation tank 38. The Flash Mix and Flocculation Tanks 38 (optional) allows for the addition of chemicals and polymers that will aid the settling process—adjusting pH to precipitate dissolved solids and/or enhancing the agglomeration of suspended particles into heavier, more settle-able floc. The liquid is fed from these tanks 38 into the clarifier 40 through the inlet chamber 42.

The liquid then enters adjacent the lower area of the laminar plates 44 through side slots which distribute it across the entire width of the laminar plates 44. Particulate settles onto the face of the laminar plates 44 and slides down to the clarifier bottom 46. The clarified liquid exits the laminar plates section through clarified fluid exit 48 at the top of the solids separating system 16 which is designed to develop and control adequate pressure drop, maintaining laminar flow through the laminar plates 44. The clarified liquid then flows through the pipe connected to clarifier exit 48 to second heat exchanger unit 26 as is further described herein.

Settled solids collect at the clarifier bottom 46 of the pyramid sludge hopper and are removed from the clarifier 40 through solids exit 50 as solids effluent. A Sludge Thickener (optional) with a rake mechanism may be utilized in place of the pyramid hopper when applicable.

The solids exit 50 is fluidly connected to mixing and macerating unit 18. In one arrangement, the solid to liquid mixture of the solids effluent exiting the clarifier bottom 46 is approximately 50% solids and 50% liquids, however any other ratio is hereby contemplated and achievable through adjustment of the solids separating system 16.

Mixing and Macerating Unit:

The system 10 includes a mixing and macerating unit 18. Mixing and macerating unit 18 is formed of any suitable size, shape and design. Mixing and macerating unit 18 receives the solids effluent from solids exit 50 of solids separating system 16. In one arrangement, mixing and macerating unit 18 also receives reclaimed water from oil and water separating unit 28 through reclaimed water pipe 52. Mixing and macerating unit 18 mixes these two components together to produce a closely controlled mixed homogeneous output of solids and liquids. In addition, mixing and macerating unit 18 includes a grinding or macerating component which grinds up any large solid particles, such as bone pieces or the like, so as to prevent large pieces from plugging any downstream components of the system 10 as well as to help improve the speed of the reaction as smaller pieces more quickly and more fully react.

As is stated previously, the output from solids exit 50 is, in one arrangement, 50-50 solids to liquids, however any other range from 0% to 100% is hereby contemplated and achievable. The output from oil and water separating unit 28 is approximately 100% liquid. The desired output from the mixing and macerating unit 18 is anywhere from 10% solid to 50% liquid, however any other range between 100% liquid and 100% solid is hereby contemplated. The inputs into the mixing and macerating unit 18 are controlled to provide the desired output.

Another feature of the mixing and macerating unit 18 is that it serves to conserve heat energy, or recycle heat energy of the system 10. The solids effluent output from solids exit 50 is approximately ambient temperature, such as 55° F. to 70° F., whereas the reclaimed water output from oil and water separating unit 28 through pipe 52 is approximately 100° F. to 200° F. As such, the output from mixing and macerating unit 18 is approximately 150° F. which exits through mixture exit pipe 54. By the system 10 conserving heat energy, this reduces the amount of heating required to elevate the temperature to the optimum level for reaction. Mixture exit pipe 54 is connected to pumping unit 20.

Pumping Unit:

The system 10 includes a pumping unit 20. Pumping unit 20 is formed of any suitable size, shape and design and serves to pump a combination of fluids and solids. Pumping unit 20 receives the mixed and macerated solid and fluid output from mixing and macerating unit 18 and pumps it to other components of the system 10.

In one arrangement, pumping unit 20 is a conventional municipal waste pump. As an example, in the arrangement shown, a Schwing Bioset, Inc., 350 SMC Drive, Somerset, Wis. 54205, municipal waste pump is utilized that includes at least two cylinders which generate a constant pushing force for smooth and continuous flow of the solid and fluid output to the other components of the system 10. The output side of pumping unit 20 is connected to first heat exchanger unit 22. Care must be taken to ensure pumping unit 20 is capable of handling the high temperature solid and fluid mixture.

First Heat Exchanger Unit:

The system 10 includes a first heat exchanger unit 22. Conventionally, a heat exchanger is a piece of equipment built for efficient heat transfer from one medium to another. The media may be separated by a solid wall to prevent mixing or they may be in direct contact. Heat exchangers are widely used in space heating, refrigeration, air conditioning, power plants, chemical plants, petrochemical plants, petroleum refineries, natural gas processing, and sewage treatment. The classic example of a heat exchanger is found in an internal combustion engine in which a circulating fluid known as engine coolant flows through radiator coils and air flows past the coils, which cools the coolant and heats the incoming air.

First heat exchanger unit 22 is formed of any suitable size, shape and design. In the arrangement shown, Komax Klean-Wall heat exchanger is presented, which is manufactured by Komax Systems, Inc. 15301 Graham St., Hunting Beach, Calif. 92649. Advantages of the Klean-Wall heat exchanger include: 400% efficiency over standard tube/shell & spiral heat exchangers; it will not clog and can pass debris up to 50% the diameter of the pipe; the system eliminates wall buildup of sludge, meaning that heat-transfer efficiency will not degrade over time, which is caused by high turbulence at boundary walls that eliminates fouling and wall build-up; the system should never require cleaning; the system improves downstream process performance by breaking up and mixing the sludge; among other advantages. While a Komax heat exchanger is presented as an example, any other form of a heat exchanger unit is hereby contemplated for use.

First heat exchanger 22 has a hot fluid line 56 which extends a length between a hot fluid input 58 which is fluidly connected to a hot fluid output 60 (not visible in FIG. 1). Heat exchanger 22 also has a cool fluid line 62 which extends a length between a cool fluid input 64 and a cool fluid output 66. The hot fluid line 56 and the cool fluid line 62 are in heat exchanging connection with one another, however they are not in fluid exchange connection with one another.

First heat exchanger unit 22 receives pressurized solid and fluid output from pumping unit 20 through pump output pipe 68 which is fluidly connected to cool fluid input 64. First heat exchanger unit 22 receives the hot oil and water output from reactor vessel 24 at hot fluid input 58. The fluid into cool fluid input 64 of first heat exchanger unit 22 is approximately 150° F. whereas the fluid into the hot fluid input 58 is approximately 650° F. As the hot fluid and cool fluid travel in opposite directions to one through the hot fluid line 56 and the cool fluid line 62, respectively, heat is transferred from the hot fluid to the cool fluid. This results in the output from cool fluid output 66 being heated to approximately 300° F. and the output from hot fluid output being cooled to approximately 400° F. The cool fluid output 66 is connected to reactor vessel 24 through reactor feed pipe 70.

Reactor Vessel:

The system 10 includes a reactor vessel 24. Reactor vessel 24 is formed of any suitable size, shape and design. In one arrangement, as is presented, reactor vessel 24 has a housing 72. Housing 72 is formed of any suitable size, shape and design. In the arrangement shown, housing 72 is generally cylindrical in shape and extends a length between a bottom end 74 and a top end 76 and includes a hollow interior 78 with a centrally positioned axis that extends there through from end to end. The bottom end 74 is closed by a bottom cover 80 and the top end 76 is closed by a top cover 82. Bottom cover 80 and top cover 82 are removable and replaceable so as to provide access to the hollow interior 78 of housing 72. Bottom cover 80 and top cover 82 are connected to the bottom end 74 and top end 76 by any means known in the art such as threaded meshing engagement, bolting, screwing, clamping or the like. A material input port 84 is positioned in the housing 72 adjacent the bottom end 74 which allows for injection of solid and fluid output from first heat exchanger unit 22. A material output port 86 is positioned in the housing 72 adjacent the top end 76 which allows for the solid and fluid output, which has now been converted to a combination of oil and water, to exit the reactor vessel 22.

Figure 3:
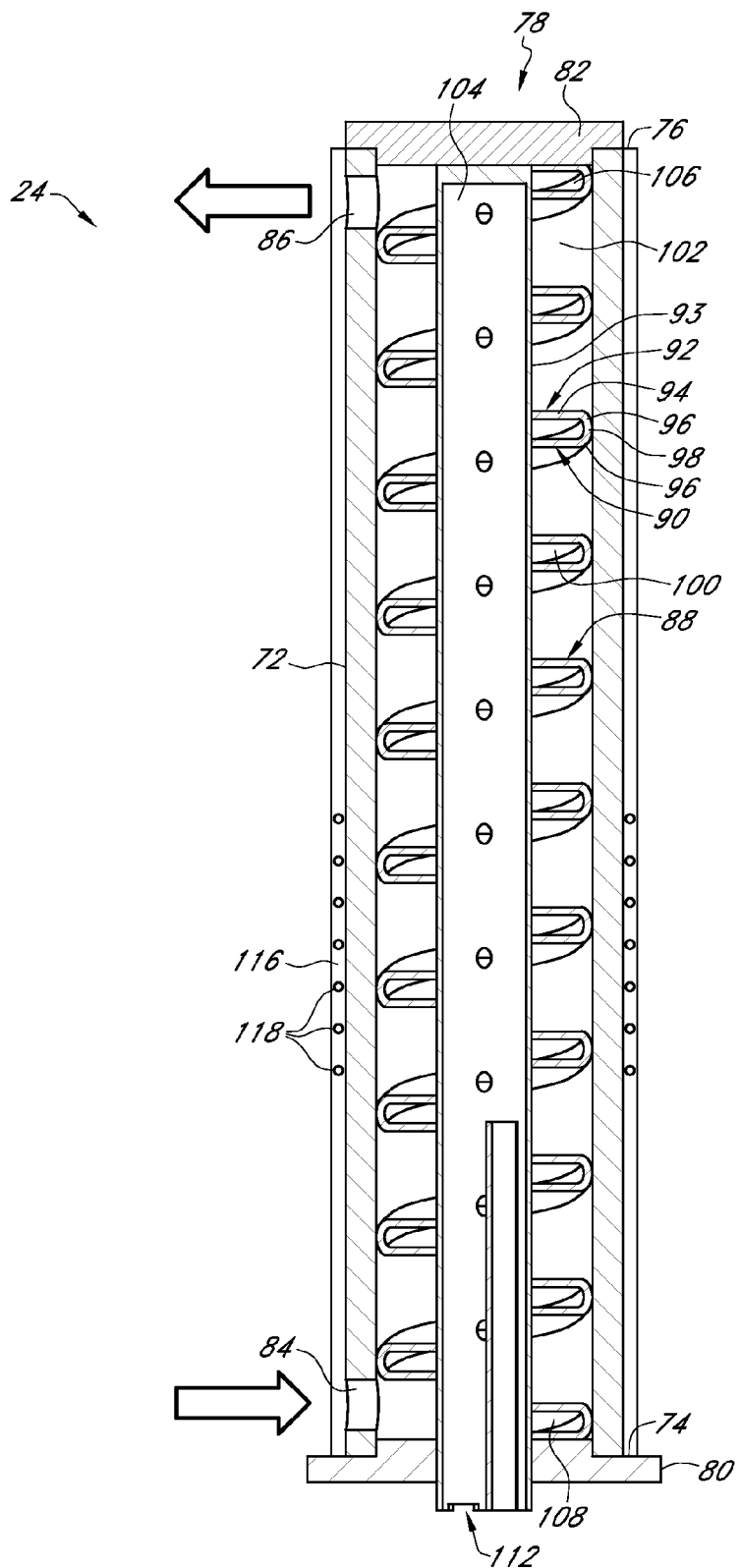
FIG. 3 is an elevation cut-away view of a first embodiment of the reactor vessel.

A screw elevator 88 is positioned within the open interior 78 of housing 72. Screw elevator 88 takes the general shape of an auger or auger flighting. More specifically, screw elevator 88 has a lower flighting 90, or a first auger blade, and an upper flighting 92, or a second auger blade, that wrap around a centrally positioned column 93 in the form of a pair of helical screw blades. Lower flighting 90 and an upper flighting 92 have a main blade section 94 that has a generally flat and level cross section when viewed from the side (as is shown in FIG. 3) which extends perpendicularly outward from column 93. The main blade section 94 of the lower flighting 90 and an upper flighting 92 are positioned in approximate parallel spaced alignment to one another such that the two augers wrap around the centrally positioned column 93 in unison with one another, maintaining equal spacing with one another along the length of column 93.

The main blade section 94 of lower flighting 90 and an upper fighting 92 terminate in an end section 96 that connects to an end section 96 of the other of lower flighting 90 or upper flighting 92. In the arrangement shown, the end section 96 of the lower fighting 90 and upper flighting 92 is rounded. In the arrangement shown, rounded end section 96 of the lower flighting 90 connects with the rounded end section 96 of upper flighting 92 at an apex point 98 which is close to or frictionally engages the interior surface of housing 72 thereby sealing the exterior edge of the screw elevator 88 to the housing 72. To accomplish this arrangement, the tolerances of the inner diameter of housing 72 and the outer diameter of apex point 98 are tightly controlled. This arrangement allows the screw elevator 88 to be inserted and removed from the housing 72 by simply pushing and pulling the screw elevator 88 into and out of the housing 72. In another arrangement, to increase the seal between the apex point 98 and the inner diameter of housing 72, the apex point 98 is received within a helical groove positioned in the interior surface of housing 72. This arrangement requires the screw elevator 88 to be rotatably inserted within housing 72 thereby providing a better seal.

In an alternative arrangement, the end section 96 of the lower flighting 90 and upper flighting 92 is not rounded and instead is squared when viewed from the side, instead of an apex point 98 at the outer diameter of the lower flighting 90 and upper flighting 92 thereby increasing the surface area that connects with or is in proximity to the interior surface of housing 72. This creates an apex plane formed by the connecting member that extends between the ends of lower flighting 90 and upper flighting 92. Any other shape or design of the end section 96 is hereby contemplated for use as is any other means or methods of sealing the end section 96 or apex point 98 to the housing is contemplated, such as welding, snap fitting, adhesives, sealants, seals or the like.

The interior edge of lower flighting 90 and upper flighting 92 are sealed to the exterior diameter of column 93 by any means known in the art such as by welding, machining, or the like. As the end sections 96 of the lower flighting 90 and upper flighting 92 are sealed to one another, this creates a sealed heat chamber 100 that extends the length of screw elevator 88 within housing 72. Heat chamber 100 is bounded by the column 93 on its interior side, and by the lower flighting 90 and upper flighting 92 on its other sides. This heat chamber 100 revolves around the centrally positioned column 93 as it extends through housing 72. Similarly, the sealing connection of the exterior edge or apex 98 of lower flighting 90 and upper flighting 92 to the interior diameter of housing 72 creates a material chamber 102. Material chamber 102, like the heat chamber 100, revolves around the centrally positioned column 93 as it extends through housing 72. In this arrangement, the upper and lower sides of the heat chamber 100 are bounded by the material chamber 102. Similarly, the upper and lower sides of the material chamber 102 are bounded by the heat chamber 100.

The material input port 84 is connected to the material chamber 102 adjacent its bottom end 74. In this way, the solid and fluid output is pumped into the material chamber 102 adjacent the housing's bottom end 74. The material output port 84 is connected to the material chamber 102 adjacent its top end 76. In this way, the solid and fluid output is pumped out of the material chamber 102 adjacent the housing's top end 76. The pressure of the pumping unit 20 forces the solid and fluid output to spin around the column 93 bounded by the lower flighting 90 on one side and bounded by the upper flighting 92 on the opposite side along the length of the housing 72.

Centrally positioned column 93 has a hollow interior 104 that fluidly connects to heat chamber 100. This hollow interior 104 fluidly connects to an upper portion 106 of heat chamber 100 or lower portion 108 of heat chamber 100. Hollow interior 104 is also fluidly connected to a heat source 110.

In one arrangement, the heat source 110 is connected to the hollow interior 104 through open bottom end 112 by pipe 114. In this arrangement, the upper portion 106 of heat chamber 100 is connected to the upper end hollow interior 104 of column 93, and the lower portion 108 of heat chamber 100 is piped back to heat source 110 for recirculation. In this arrangement heated air or steam is pumped up through the hollow interior 104 of column 93 from open bottom end 112 through the length of column 93. Once the heated air or steam reaches the upper end of column 93 it enters the heat chamber 100 of the screw elevator 88 adjacent upper portion 106 and spirals downward until it exits the housing 72 through lower portion 108, at which point the heated air or steam is recycled through pipe 114 to heat source 110, and the process repeats itself.

In a similar, but slightly different arrangement, the heat source 110 is connected to the lower portion 108 of heat chamber 100 by pipe 114. In this arrangement, the upper portion 106 of heat chamber 100 is connected to the upper end hollow interior 104 of column 93, and open bottom end 112 of hollow interior 104 is piped back to heat source 110 for recirculation. In this arrangement heated air or steam is pumped up through the heat chamber 100 from lower portion 108, spiraling around column 93 until it reaches the upper portion 106. Once the heated air or steam reaches the upper end of upper portion 106 of heat chamber 100 it enters the hollow interior 104 of column 93 at which point it travels down column 93 until it exits the housing through open bottom end 112, at which point the heated air or steam is recycled through pipe 114 to heat source 110, and the process repeats itself.

The same, but opposite arrangements can be accomplished by inverting housing 72 to achieve a similar but slightly different process flow.

Heat source 110 is any form of heat that is usable in the system 10 such as a super-heated steam generator, a super-heated air generator, a super-heated fluid generator, or the like. In one arrangement, as is shown, a HGS-S or HGA-S-CX steam generator manufactured by Micropyretics Heaters International, of 750 Redna Terrace, Cincinnati, Ohio 45215 USA is presented. However any other heated air, steam or fluid generator manufactured by any maker is hereby contemplated for use.

The exterior surface of housing 72 is wrapped in an insulating material 116. In an alternative arrangement, heating coils 118 extend around all or a portion of the exterior of housing 72, between housing 72 and insulating material 116 or within insulating material 116 to provide additional heat to housing 72.

The material output port 86 of material chamber 102 is fluidly connected to first heat exchanger unit 22 through pipe 120. Pipe 120 transmits the heated output from material output port 86 to the hot fluid input 58 of first heat exchanger unit 22. The heated output passes through the hot fluid line 56 and exits first heat exchanger unit 22 through pipe 122. The heated output from material output port 86 exits the reactor vessel 24 in the range of somewhere around or between 500° F.-1,000° F. or in one arrangement at approximately 650° F. As the heated output passes through the hot fluid line 56 it exchanges heat with the material in cool fluid line 62. As the material exits hot fluid output 60 (not visible in FIG. 1), it has been cooled in the range of somewhere around or between 200° F.-800° F. or in one arrangement to approximately 400° F. Pipe 122 is connected to second heat exchanger unit 26.

Second Heat Exchanger Unit:

In one arrangement, to improve heat retention and thermal efficiencies, the system 10 includes a second heat exchanger unit 26 that is similar, if not identical to, first heat exchanger unit 22. As such, for purposes of brevity, reference is made to the section(s) discussing first heat exchanger unit 22 and the material presented with respect to first heat exchanger unit 22 is incorporated and applied equally to second heat exchanger unit 22.

Second heat exchanger unit 26 is formed of any suitable size, shape and design. In the arrangement shown, a Komax Klean-Wall heat exchanger is presented, which is manufactured by Komax Systems, Inc. 15301 Graham St., Hunting Beach, Calif. 92649 is shown. Second heat exchanger unit 26 has a hot fluid line 124 which extends a length between a hot fluid input 126 which is fluidly connected to a hot fluid output 128. Second heat exchanger unit 26 also has a cool fluid line 130 which extends a length between a cool fluid input 132 and a cool fluid output 134. The hot fluid line 124 and the cool fluid line 130 are in heat exchanging connection with one another, however they are not in fluid exchange connection with one another.

Second heat exchanger unit 26 receives pressurized hot oil and water output from first heat exchanger unit 22 at hot fluid input 126 (not visible in FIG. 1) through pipe 122. This fluid into hot fluid input 126 of second heat exchanger unit 26 is approximately 400° F. Second heat exchanger unit 26 receives fluid from clarified fluid exit pipe 48 connected to solids separating system 16 at the cool fluid input 132. The cool fluid from the solids separating system 16 is approximately ambient temperature (such as 55° F.). As the hot fluid and cool fluid travel in opposite directions to one through the hot fluid line 124 and the cool fluid line 130, respectively, heat is transferred from the hot fluid to the cool fluid. This results in the output from cool fluid output 134 being heated to approximately 150° F. and the output from hot fluid output being cooled to approximately 200° F. The cool fluid output 134 is connected to pipe 136 which returns the clarified fluid back to lagoon 14, or to a separate lagoon for clarified fluid that has been processed through the system 10.

Hot fluid output 128 is connected by pipe 138 to the input of oil and water separating unit.

Oil and Water Separating Unit:

The system 10 includes an oil and water separating unit 28. Oil and water separating unit 28 is formed of any suitable size, shape and design. Oil and water separating unit 28 serves to separate the oil produced in reactor vessel 24 from the non-oil components, identified as water herein. Any form of an oil and water separator is hereby contemplated for use. In the arrangement shown, a pressure rated two phase, three phase or four phase separator manufactured by Hydro-Flo Technologies, Inc., or 3985 Commerce Drive, St Charles, Ill. 60174, is presented. This system includes a vertical chamber 140 with an input port 142 that receives the oil and water mixture from reactor vessel 24, an oil output port 144 and a non-oil output port 146. The output from second heat exchanger 26 is approximately 200° F. and as such, care is taken to select an oil and water separating unit 28 that can handle fluids at this high temperature.

Upon entry of the oil and water mixture to oil and water separating unit 28 through input port 142, the fluid enters vertical chamber 140. The oil and water are separated and the oil it transmitted through oil output port 144 and the non-oil component of the mixture is transmitted through the non-oil output port 146. The oil output port 144 is connected to oil pipe 148 which transmits the oil to oil storage facility 30, such as a tank. The non-oil output port 146 is connected to reclaimed water pipe 52 which is transmitted to the mixing and macerating unit 18 as is described herein. The non-oil output is approximately 150° F., and in this way utilizing the non-oil output from the system 10 to mix with the solid effluent from the solids separating system 16 recycles some of the heat energy of the system 10.

In Operation:

Animal waste (biomass) stored in a lagoon 14 is pumped through pipe 36 to a solids separating system 16. The solids are separated from the liquids to form approximately a 50/50 combination of solids and fluids or any other desired combination. This solids and fluid output is pumped from the solids separating system 16 to the mixing and macerating unit 18.

In the mixing and macerating unit 18, the solids are ground to ensure that there are no particles larger than a predetermined size so as to prevent blockage of the system 10 and improve the efficiency of the conversion process. The solids to liquids combination is mixed with reclaimed water through reclaimed water pipe 52 which is connected to the non-oil output port 146 of the oil and water separating unit 28 to achieve the desired density of solids to liquids, which in one arrangement is anywhere from 10% to 50% solids to liquids or more. This mixture is then transmitted through pipe 54 to pumping unit 20.

Pumping unit 20 pumps the solid and liquid mixture through pipe 68 through the cool fluid line 62 of first heat exchanger unit 22 wherein the solid and fluid mixture receives heat from the output from reactor vessel 24 which is pumped through the hot fluid line 56. This warms the solid and fluid mixture prior to entering the reactor vessel 24.

The warmed solid and fluid mixture enters the reactor vessel 24 under pressure through material input port 84. The solid and fluid mixture is forced by the pressure to slide in circular motion around the centrally positioned column 93 within the material chamber 102 between the upper surface of the upper flighting 92 and the lower surface of the lower flighting 90. Super-heated air or steam is pumped through the heat chamber 100 between the upper flighting 92 and lower flighting 90 and through the hollow interior 104 of centrally positioned column 93. This heat surrounds the solid and fluid mixture, and along with the extreme pressure exerted on the solid and fluid mixture within the reactor vessel 24, converts the solid and fluid mixture to complex hydrocarbons and water, or said another way, converts the solid and fluid mixture to a mixture of oil and water.

The oil and water mixture exits the material chamber 102 through material output port 86 in the range of somewhere around or between 500° F.-1,000° F. or in one arrangement at approximately 650° F., or any other desired temperature, and is transmitted through pipe 120 to and through the hot fluid line 56 of first heat exchanger unit 22. Next, the slightly cooled oil and water mixture is transmitted to the hot fluid line 124 of the second heat exchanger 26 where it is cooled again by the clarified water from solids separating unit 16. The clarified water is returned to lagoon 14 and the cooled oil and water mixture is transferred through pipe 138 to the oil and water separating unit 28.

The oil and water separating unit 28 separates the oil from the water. The oil is transmitted through oil output port 144 through pipe 148 to oil storage facility 30 where it is stored until sold or consumed. The non-oil or water component is transmitted through the non-oil output port 146, through reclaimed water pipe 52 and transmitted to mixing and macerating unit 18 to be reused in the system in the manner described herein.

The speed at which the solid and water mixture passes through the reactor vessel 24 is controlled by valuing, as is the pressure and temperature of the reactor vessel 24. In this way, the optimum performance and optimum conversion of the solid and water mixture to oil and water mixture can be achieved. In addition, the system 10 presents a system that has continuous throughput, meaning the system 10 never stops producing oil and as material exits the reactor vessel 24 new material enters the reactor vessel 24.

Cleaning:

In the event the system shuts down unexpectedly the partially processed material has a tendency to harden as it cools. This can easily be corrected by simply removing the bottom cover 80 and/or the top cover 82 and removing the screw elevator 88. Once removed, the screw elevator 88 can be cleaned and/or repaired, as can be the interior of housing 72. Once cleaned, the screw elevator 88 can be reinserted into the housing 72 and the covers 80, 82 reattached and the system 10 is ready for operation. This is a substantial improvement over the prior art and reduces the down time or potential down time of the system 10.

Second Embodiment

Figure 4:
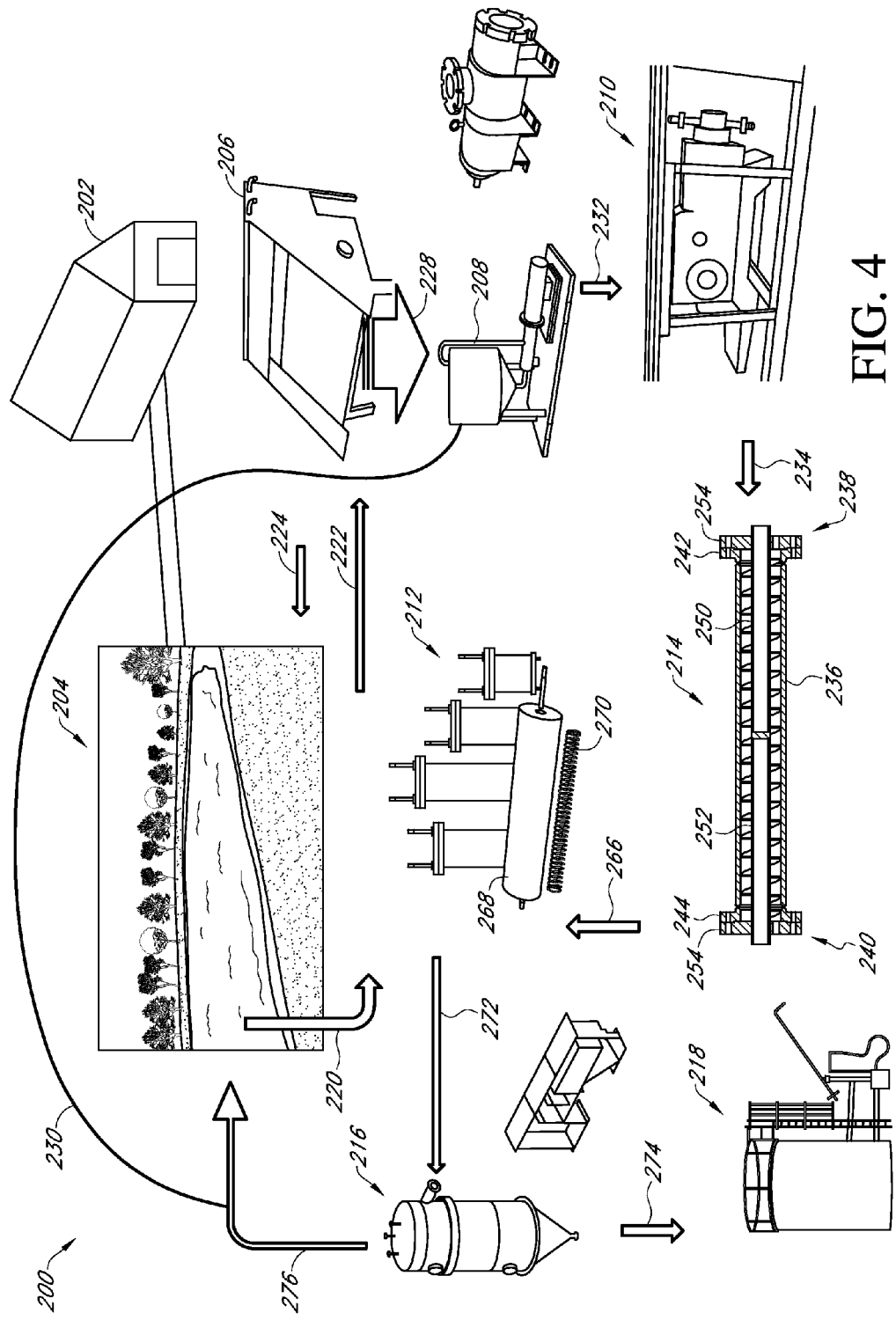
FIG. 4 is a plan view of the individual components of a second embodiment of the system and how the components are linked to one another.

With reference to FIG. 4, a second embodiment for converting biomass into fuel, oil and other useful products is presented with respect to reference numeral 200. This second embodiment 200 is similar to the first embodiment 10 and incorporates the teachings thereof as is described herein. The second embodiment 200 differs from the first embodiment in the following manners. The second embodiment includes a confinement building 202, waste storage facility or lagoon 204, a solids separating system 206, a mixing and macerating unit 208, a pumping unit 210, a heat exchanger unit 212, a reactor vessel 214, an oil and water separating unit 216 and an oil storage facility 218.

In this arrangement, animal waste (biomass) stored in lagoon 204 is pumped through line 220 into the cool fluid inlet of heat exchanger unit 212. In one arrangement, a Wemco chopper pump manufactured by Weir, Inc. having an address of 440 West 800 South, Salt Lake City, Utah, 84101 is used for this process, however, any other form of a pump is contemplated for use. This fluid enters heat exchanger at ambient temperature, in the range of 55° F. to 70° F., and exits at an elevated temperature, in the range of about 100° F. to 200° F. This slightly heated fluid passes through line 222 and enters solids separating system 206 where it is separated into the desired proportion of solids to liquids for optimum reaction performance. As one example, a Kason Static Dewatering system, manufactured by Kason Corporation of 67-71 East Willow St., Millburn, N.J. 07041-1416 is used. However, any other form of a dewatering system is herein contemplated for use.

The liquid output from solids separating system 206 passes through line 224 and is returned to lagoon 204. While some cooling occurs during the solid separating process, this liquid output is still elevated in temperature, and in a third embodiment (as is further described herein) instead of diverting this liquid output directly back into the lagoon 204, this heated fluid may be selectively passed through radiant heat piping 226 in confinement building 202 to simultaneously accomplish the goals of (a) further cooling the liquid output before returning it to the lagoon 204, and (b) heating the confinement building 202 thereby saving energy costs.

The dewatered output from solids separating system 206 then passes through line 228 into mixing and macerating unit wherein it is chopped up, to eliminate any solids, as well a mixed with liquid output from oil and water separating unit 216 fed to it through line 230 to achieve the desired fluidity for optimum performance.

The mixture then passes through line 232 and enters pumping unit 210 where it is pressurized and passed through line 234 before entering reactor vessel 214. While any form of a pump is hereby contemplated for use as a pumping unit 210, in one arrangement a Pulsamatic® Stroke Control model 8480 adjustable high pressure low volume pump manufactured by Pulsafedder® of 2882 Brighton Henrietta Townline Rd., Rochester, N.Y. 14623 is specifically contemplated for use.

Second Embodiment of Reactor Vessel

Reactor vessel 214 is similar to the first embodiment of reactor vessel 24, with the following differences. Reactor vessel 214 has a housing 236 which is formed of any suitable size, shape and design. In the arrangement shown, housing 236 is generally cylindrical in shape with a hollow interior 237 that extends a length between a first end 238 or entry end, and a second end 240 or exit end. The bottom end 74 is closed by a bottom cover 80 and the top end 76 is closed by a top cover 82. A first mounting flange 242 is connected to the first end 238 and a second mounting flange 244 is connected second end 240. Mounting flanges 242, 244 connect at their interior edges to their respective ends 238, 240 of housing 240 and extend outward therefrom. Mounting flanges 242, 244 have a hollow interior or central passageway that corresponds in size to the size of the hollow interior 237 of housing 236 so as not to restrict the size of components that can be inserted into the hollow interior 236 of housing 236. The exterior faces of mounting flanges 242, 244 are generally flat and include a plurality of openings 246 around the periphery of the flanges 242. These openings 246 allow for mounting of components thereto, and the flat outward-facing surfaces allow for sealing of components mounted thereto as is described herein.

A screw elevator 248 is positioned within the hollow interior 237 of housing 236. In the arrangement shown, screw elevator 248 is formed of two parts, a first section 250 and a second section 252 that are separate from one another. The first section 250 and second section 252 are similar if not identical to one another and are formed of a cap 254 positioned at their outward most end. Caps 254 are generally flat and planar in shape and include a plurality of openings therein that align with the openings 246 in mounting flanges 242, 244 of housing 236. In this way, when first section 250 and second section 252 are inserted within the hollow interior 237 of housing 236 the inner surface of caps 254 are in flat and flush sealing engagement with the exterior surface of mounting flanges 242, 244. In this position, conventional fasteners 255, such as screws, bolts, clamps or the like are inserted through the aligned openings 246 thereby holding the first section 250 and second section 252 within housing 236 even under extreme pressure. When inserted within the hollow interior 237, the inner most ends of first section 250 and second section 252 are positioned adjacent one another, and/or in abutting engagement with one another. In the arrangement shown, first section 250 and second section 252 engage one another at the seam line 256 which in the arrangement shown is positioned at the approximate center of housing 236 which makes the first section 250 and second section 252 approximately equal lengths, however seam line 256 is contemplate at any other position within housing 236.

First section 250 and second section 252 include a drywell 258 which is generally cylindrical in shape and extends a length from cap 254 and terminates in a closed end at seam line 256. Drywell 258 is generally centrally positioned within cap 254 as well as being generally centrally positioned with in the hollow interior 237 of housing 236 when positioned therein. The outward end of drywell 258 is connected to cap 254, and in the arrangement shown, extends past the cap 254 a short distance. With the outward end of drywell 258 connected to cap 254 and the inner end closed, drywell 258 is sealed off from the hollow interior 237 of housing 236. In the arrangement shown, drywell 258 is positioned within and extends in alignment with the center axis of housing 236. In this way, drywell 258 is similar to column 93 and therefore in a manner of speaking the terms drywell 258 and column 93 are interchangeable terms.

Flighting 260 is connected to the exterior surface of drywell 258 and extends from the interior edge of cap 254 to the seam line 256 as it extends in circular fashion around drywell 258. The exterior edge of flighting 260 is sized and shaped to fit within the hollow interior 237 of housing 236 frictionally or with close and tight tolerances. In this way, first section 250 can be inserted into and withdrawn from the first end 238 of housing 236, and second section 252 can be inserted into and withdrawn from the second end 240 of housing 236 once the fasteners 255 that hold flanges 242, 244 to caps 254 are removed.

A port 262 is positioned in caps 254 and extends through caps 254 providing access to the hollow interior 237 between drywell 258 and the interior surface of housing 236. Port 262 in first section 250 allows for the insertion of animal waste (biomass) into hollow interior 237 from pumping unit 210. Port 262 in second section 252 allows for the animal waste (biomass) to exit hollow interior 237 and move on to the other stages of the system 200.

In this arrangement, a heating element 264 is positioned within the drywell 258 of first section 250 and second section 252. Heating element 264 is any form of a device that generates or transmits heat. In one arrangement, heating element 264 is a coiled filament-type heating element that converts electricity into heat through the process of resistive or Joule heating by the process where electric current passing through the heating element encounters resistance, resulting in the generation of heat.

Figure 8A:
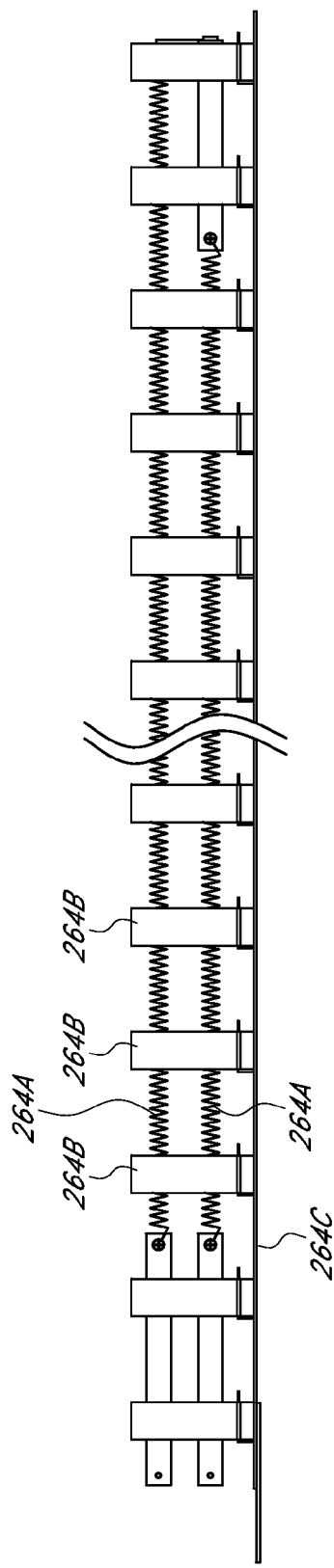
FIG. 8A is a side elevation view of a heating element for use in the system.

With reference to FIGS. 8A and 8B, one example of such a heating element is a 3" Open Coil Element electrically rated at 8.33 kW. 480V. 3Ø. 10 A. manufactured by Process Heating Co, 2732 Third Ave. So., Seattle Wash. 98134. In this example, heating element 264 is formed of a plurality of filaments 264A that are positioned in parallel spaced alignment to one another and are strung between and through openings in a plurality of supports 264B. Supports 264B are connected to and positioned in parallel spaced alignment along the length of a backing 264C. In the arrangement shown, three filaments 264A are utilized with spaces 264D for an additional three filaments should additional heating be desired. In this arrangement, the size and shape of backing 264C and supports 264B are such that the heating element 264 can be slid into and out of drywell 258.

Any other form of a heating element is hereby contemplated for use such as water, liquid, steam, infrared, conduction, convection or the like. By having a first section 250 and a second section 252 which are separate and apart from one another, the temperatures of the first section 250 and second section 252 can be independently controlled, if such process control is desired. That is if it is desired that the first section 250 be hotter or cooler than the second section 252, this can be accomplished by independently controlling the heating elements 264.

Figure 7:
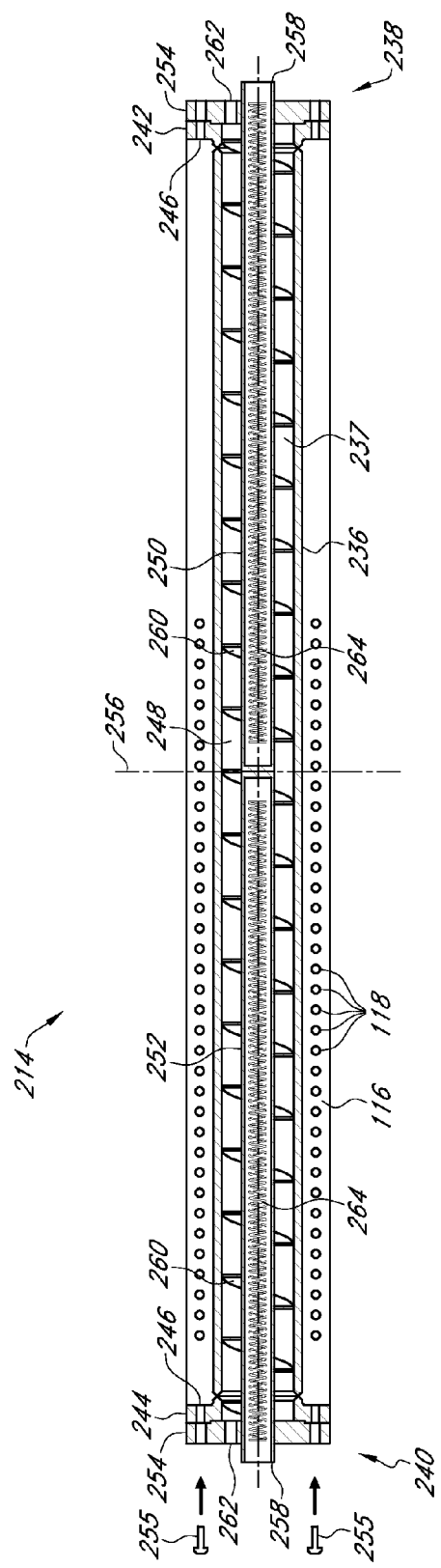
FIG. 7 is an elevation cut-away view of a third embodiment of the reactor vessel.

In one arrangement, as is shown in FIG. 7, the housing 236 is horizontally aligned, whereas in FIG. 3, the housing 72 is vertically aligned. When using heating elements 264 it may be desirable to align the housing in a horizontal fashion so as to prevent the coils of the heating element 264 from sagging and contacting one another causing shorting or other inefficiencies. However this can be overcome by designing the heating coils to resist sagging. Regardless, it is hereby contemplated to align the housing 72/236 either in horizontal, vertical or any other alignment.

The animal waste (biomass) enters the port 262 in of the first section 250 under pressure from the pumping unit 210. This pressure forces the animal waste through the hollow interior 237 and around the first section 250 and second section 252 between the exterior surface of drywell 258 and the interior surface of housing 236. The flights of the flighting 260 cause the animal waste (biomass) to circulate around the drywell 258 as it moves from the first end 238 to the second end 240 while simultaneously being subjected to the heat and pressure therein. This heat and pressure causes the animal waste to convert to desired products, such as complex hydrocarbons, as they reach closer and closer to the second end 240 of housing 236.

Heat Exchanger:

As the animal waste (biomass) exits the port 262 in second end 240 of reactor vessel 214, the animal waste (biomass) is transported through line 266 into the hot fluid line of heat exchanger unit 212. As the hot fluid passes through the hot fluid line of the heat exchanger unite 212 the hot fluid transmits heat to the cool fluid thereby cooling the hot fluid and heating the cool fluid.

In one arrangement, as is shown, heat exchanger 212 is a helical coil, tube-in-tube heat exchanger, such as those manufactured by Sentry Equipment Corp., 966 Blue Ribbon Circle North, Oconomowoc, Wis. 53066. These heat exchangers include an outer container 268 that holds and allows the cool fluid to flow there through, and a helical coil tubing 270 that extends through that allows the hot fluid to flow there through. However, it is hereby contemplated that the orientation can be reversed with the hot fluid flowing through the outer container 268 and the cool fluid 270 flowing through the helical coil 270.

The cooled hot fluid leaves the heat exchanger unit 212 through line 272 and enters oil and water separating unit 216 wherein the oil is separated from the water. Once separated, the oil portion is transported through line 274 and into oil storage facility 218 where it is stored until transported for further refining or use; and the water portion is transported through line 276 to back to the lagoon 204 with a portion being siphoned off through line 230 and into the mixing and macerating unit 208 as is described herein.

Third Embodiment

Figure 5:
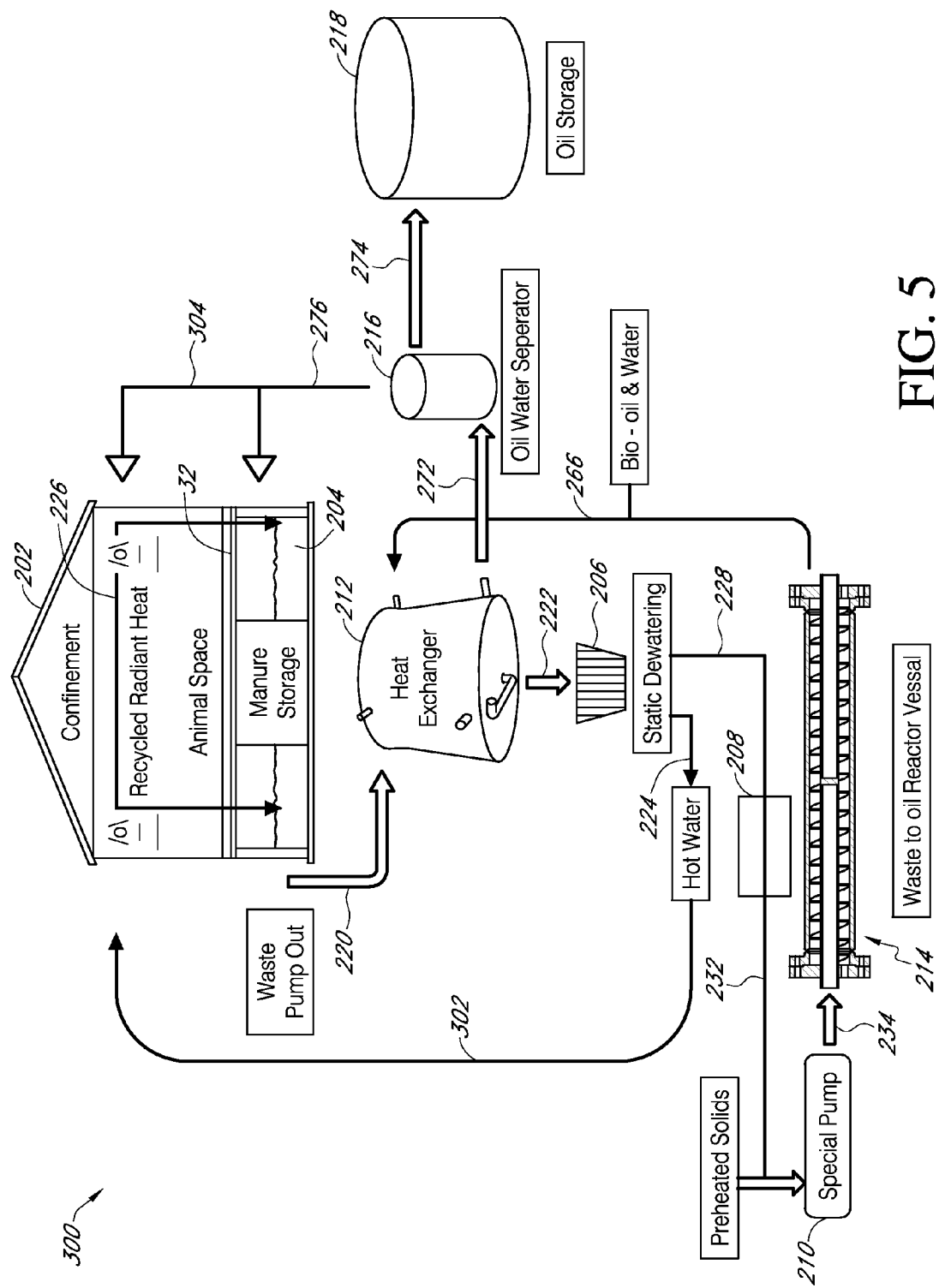
FIG. 5 is a plan view of the process layout of the second embodiment of the system.
Figure 6:
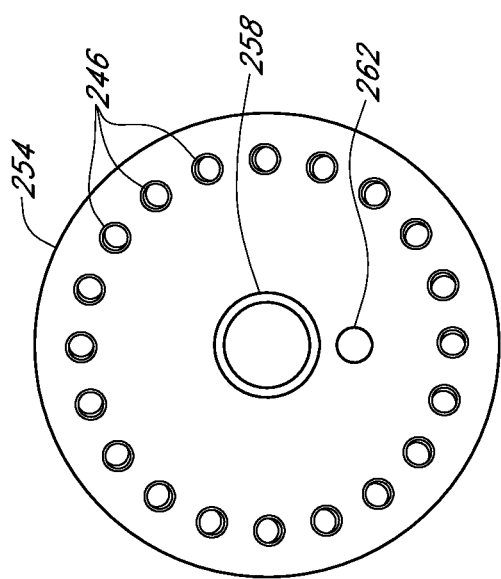
FIG. 6 is an elevation view of the end of a second embodiment of the reactor vessel.

With reference to FIG. 5, a third embodiment for converting biomass into fuel, oil and other useful products is presented with respect to reference numeral 300. This second embodiment 300 is similar to the first embodiment 10 and second embodiment 200 and incorporates the teachings thereof as is described herein. The third embodiment 200 differs from the first embodiment 10 and second embodiment 200 in the following manners. The third embodiment includes a confinement building 202, waste storage facility or lagoon 204, a solids separating system 206, a mixing and macerating unit 208, a pumping unit 210, a heat exchanger unit 212, a reactor vessel 214, an oil and water separating unit 216 and an oil storage facility 218, as is described herein.

The third embodiment differs from the first embodiment and second embodiment 200 to retain heat energy and lower energy costs for producers, fluids that are heated through the process described herein selectively pass through radiant heat piping 226 in the confinement building 202 before being deposited back in lagoon 204. More specifically, the liquid output from the solids separating unit 206 is passed through line 302 and into radiant heat piping 226 positioned in the confinement building 202. Similarly, the output from oil and water separating unit 216 is passed through line 304 and into radiant heat piping 226 positioned in the confinement building 202.

Radiant heat piping 226 is formed of any suitable size, shape and design. In one arrangement, radiant heat piping 226 is formed of a matrix of pipes positioned across the ceiling, floors and/or walls of confinement building 202. To selectively direct the fluids through the radiant heat piping 226, a valve or other control is connected between lines 302 and 304 and radiant heat piping 226. This allows the heated fluids to be directed though the radiant heat piping 226 when desired (such as in winter time) and allows the heated fluids to be directed directly back to the lagoon 204 when additional heat is not desired in the confinement building 202 (such as in summer time).

A Note About Flighting Pitch and Density and its Effects on Output:

The flighting 260 causes the biomass to circulate around the center of the reaction chamber. Therefore, density of the flighting effects the amount of distance the biomass travels within the reaction vessel 214. Therefore, the tighter the flighting coils are together the more distance the biomass must travel within the reaction vessel 214; conversely the more spread-apart the flighting coils the less distance the biomass must travel within the reaction vessel 214. As one example, when there are twice as many flights to the flighting 260 the biomass must travel around the center of the reactor vessel 214 twice as many times. In addition, by causing the biomass to spin around more flights of the flighting 260 this can cause additional mixing or turbidity of the biomass which can also effect output of the reactor vessel. This may cause a more uniform output with less charring as the material will move at a higher speed through the reactor vessel 214 and the material will be more evenly exposed to the heat sources of the system due to the increased mixing. Therefore the density of the coils of flighting 260 can be varied to provide varied output. Again, if it is desired that the biomass travel a greater amount of distance within the reactor vessel 214, tighter coil density is selected; whereas if it is desired that the travel less distance within the reactor vessel 214, a wider coil density is selected.

Along with flighting density, the amount of time the biomass remains in the reactor vessel 214 is also effected by the pressure applied to the biomass and the fluidity of the biomass. The amount of time the biomass remains in the reactor vessel 214 can also be changed or effected by the ease at which the biomass can enter and/or exit the reactor vessel 214. To control the speed of the input and/or output of biomass into the reactor vessel 214 variable and controllable valves are added to the ports 262 at the input side and/or output side of the reactor vessel 214. In one arrangement, to keep the biomass within the reactor vessel 214 for a longer period of time at higher pressure, the controllable valve positioned at the output side of the reactor vessel 214 in communication with port 262 is closed or restricted. In contrast, to cause the to keep the biomass within the reactor vessel 214 for a shorter period of time at lower pressure, the controllable valve positioned at the output side of the reactor vessel 214 in communication with port 262 is opened or made to be less restrictive.

The throughput of the reactor vessel 214 can similarly be effected by increasing or decreasing the fluidity of the biomass as well as the pressure applied to the biomass.

From the above discussion it will be appreciated that a system and method for converting animal waste (biomass) into fuel and other useful products shown and described herein improves upon the state of the art.

Specifically, the a system and method for converting animal waste (biomass) into fuel and other useful products; provides greater value to a producer than merely using the animal waste as fertilizer; is durable; is easy to clean; provides a continuous flow; is efficient; recycles heat and energy; produces oil, fuel and other useful and valuable products; can be utilized in large and small scale confinement building operations; reduces the amount of waste a producer must handle; provides the animal producer with an alternative source of income; is simple; has a minimum number of parts; is relatively inexpensive; has an intuitive design, among countless other advantages and improvements.

It will be appreciated by those skilled in the art that other various modifications could be made to the device without parting from the spirit and scope of this invention. All such modifications and changes fall within the scope of the claims and are intended to be covered thereby.

What is claimed is:

1. A system for converting biomass material into fuel and other useful products comprising:
   a reactor vessel;
   the reactor vessel having a housing extending a length from a first end to a second end and having an interior surface that defines a hollow interior;
   a screw elevator positioned within the hollow interior;
   the screw elevator having a first auger blade that wraps around a center axis of the hollow interior and extends a length between first end and second end;
   wherein the screw elevator is positioned in a stationary manner within the hollow interior of the housing of the reactor vessel such that the screw elevator defines a pathway for the biomass material to move through the hollow interior;
   wherein when the biomass material is introduced into the housing, the biomass material is forced around the first auger blade as it is exposed to heat and pressure within the hollow interior, thereby converting the biomass material partially into an oil substance.

2. The system of claim 1 wherein an exterior edge of the first auger blade engages an interior surface of the housing.

3. The system of claim 1 further comprising a second auger blade positioned in spaced alignment to the first auger blade.

4. The system of claim 3 wherein the first auger blade and the second auger blade connect to one another thereby forming a heat chamber between the first auger blade and the second auger blade.

5. The system of claim 1 wherein the material is a combination of animal waste solids and liquids.

6. The system of claim 1 wherein the auger blade is removable from an end of the reactor vessel.

7. The system of claim 1 further comprising a drywell extending positioned within the hollow interior of the reactor vessel, the drywell having a heating element.

8. The system of claim 1 further comprising insulating material positioned around an exterior surface of the housing.

9. The system of claim 1 further comprising at least one heating element positioned around an exterior surface of the reactor vessel.

10. The system of claim 1 wherein material is converted in a continuous flow process.

11. The system of claim 1 wherein an exterior edge of the first auger blade of the screw elevator is positioned in close proximity to or in engagement with the interior surface of the hollow interior of the reactor vessel.

12. The system of claim 1 further comprising a pumping unit fluidly connected to an input side of the hollow interior of the housing of the reactor vessel and configured to pump biomass material into the hollow interior of the housing.

13. A system for converting biomass material into fuel and other useful products comprising:
   a housing extending from a first end to a second end and having a hollow interior;
   an auger positioned within the housing and extending around a central axis of the housing;

wherein the auger is positioned in a stationary manner within the hollow interior of the housing and defines a pathway for the biomass material to pass through the hollow interior of the housing; and wherein when the biomass material is introduced into the first end of the housing, the biomass material is forced around the auger as it is exposed to heat and pressure, thereby partially converting the biomass material into hydrocarbons in a continuous flow process.

14. The system for converting biomass into fuel and other useful products of claim 13 wherein the auger is formed of a first auger blade positioned in spaced relation to a second auger blade.

15. The system for converting biomass into fuel and other useful products of claim 13 further comprising a hollow column positioned within the housing and an inner edge of the auger is connected to the hollow column.

16. The system for converting biomass into fuel and other useful products of claim 13 wherein the auger is formed of a first section which is inserted into the first end and a second section which is inserted into the second end.

17. The system for converting biomass into fuel and other useful products of claim 13 further comprising a heating element positioned within a hollow column positioned within the housing.

18. The system of claim 13 wherein an exterior edge of the first auger blade of the screw elevator is positioned in close proximity to or in engagement with the interior surface of the hollow interior of the reactor vessel.

19. The system of claim 13 further comprising a pumping unit fluidly connected to an input side of the hollow interior of the housing of the reactor vessel and configured to pump biomass material into the hollow interior of the housing.

20. A method for converting biomass material into fuel and other useful products comprising:
providing a housing that extends a length from a first end to a second end and has a hollow interior;
positioning an auger within the housing wherein the auger is stationary within the hollow interior of the housing and defines a pathway for the biomass material to pass through the hollow interior of the housing;
pressurizing liquid biomass material using a pump;
forcing the biomass material into the hollow interior of the housing through an entry port;
heating the biomass material within the housing while the biomass moves from the first end to the second end guided by the auger such that the biomass travels around the auger as the auger remains stationary;
converting the biomass into an oil-like substance within the housing; forcing the biomass out of the hollow interior of the housing through an exit port; and
separating the oil-like substance from byproducts.

* * * * *